US011481382B2

(12) United States Patent
Zhu

(10) Patent No.: US 11,481,382 B2
(45) Date of Patent: Oct. 25, 2022

(54) METHOD AND SYSTEM TO ENSURE TRUSTWORTHY DATA EXCHANGE IN A DISTRIBUTED LEDGER SYSTEM

(71) Applicant: Kabushiki Kaisha Toshiba, Minato-ku (JP)

(72) Inventor: Ziming Zhu, Bristol (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 158 days.

(21) Appl. No.: 16/937,898

(22) Filed: Jul. 24, 2020

(65) Prior Publication Data
US 2022/0027341 A1 Jan. 27, 2022

(51) Int. Cl.
*G06F 16/23* (2019.01)
(52) U.S. Cl.
CPC .................. *G06F 16/2365* (2019.01)
(58) Field of Classification Search
CPC ..................... G06F 16/2365; G06F 16/256
See application file for complete search history.

(56) References Cited

U.S. PATENT DOCUMENTS

| 10,304,143 B2 | 5/2019 | Kasper et al. | |
|---|---|---|---|
| 2020/0128044 A1* | 4/2020 | Xie | H04L 63/123 |
| 2020/0228316 A1* | 7/2020 | Cahill | G06F 8/65 |
| 2021/0264419 A1* | 8/2021 | Ratakonda | G06Q 20/403 |

FOREIGN PATENT DOCUMENTS

WO WO 2018/183768 A1 10/2018

OTHER PUBLICATIONS

Sun, Blockchain-Enabled Wireless Internet of Things: Performance Analysis and Optimal Communication Node Deployment, pp. 5791-5802 (Year: 2019).*
Jing Hua, et al., "Blockchain Based Provenance for Agricultural Products: A Distributed Platform with Duplicated and Shared Bookkeeping" 2018 IEEE Intelligent Vehicles Symposium (IV), Jun. 26-30, 2018, 5 pages.

* cited by examiner

*Primary Examiner* — Albert M Phillips, III
(74) *Attorney, Agent, or Firm* — Oblon, McClelland, Maier & Neustadt, L.L.P.

(57) ABSTRACT

A computer implemented method of providing a localised consensus mechanism for a distributed ledger comprising a plurality of nodes. The method comprises, in one or more nodes of the plurality of nodes, receiving, from a sensor associated with the node of the plurality of nodes, a signal indicative of a physical property sensed by the sensor and generating, based on the received signal, an initial transaction record. The method further comprises forming a localised consensus of a transaction record to be added to the distributed ledger based on the initial transaction records generated by the one or more nodes of the plurality of nodes, generating said transaction record using the localised consensus and adding the transaction record to the distributed ledger.

15 Claims, 5 Drawing Sheets

METHOD AND SYSTEM TO ENSURE TRUSTWORTHY DATA EXCHANGE IN A DISTRIBUTED LEDGER SYSTEM

FIELD

Embodiments described herein relate generally to a local consensus based transaction recording process suitable for supporting trustworthy data exchange in a distributed ledger system.

BACKGROUND

Product traceability requires multiple stakeholders across the domain of the supply chain, including factories, distribution warehouses, retail shops, to publish and share product location and environmental monitoring data. There is a desire for an improved way to trace changes in a physical condition of products.

Figure 1:
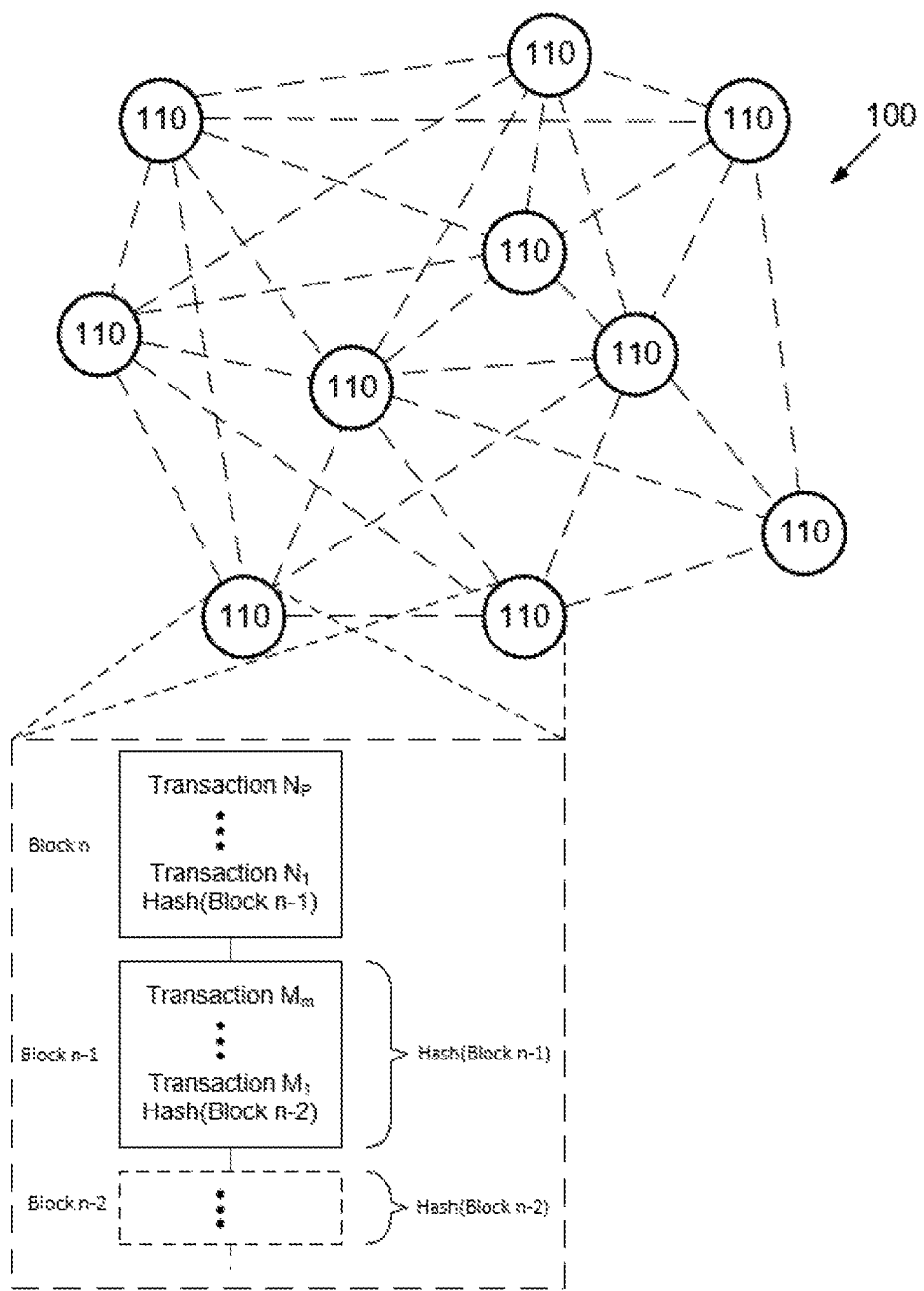
Figure 2:
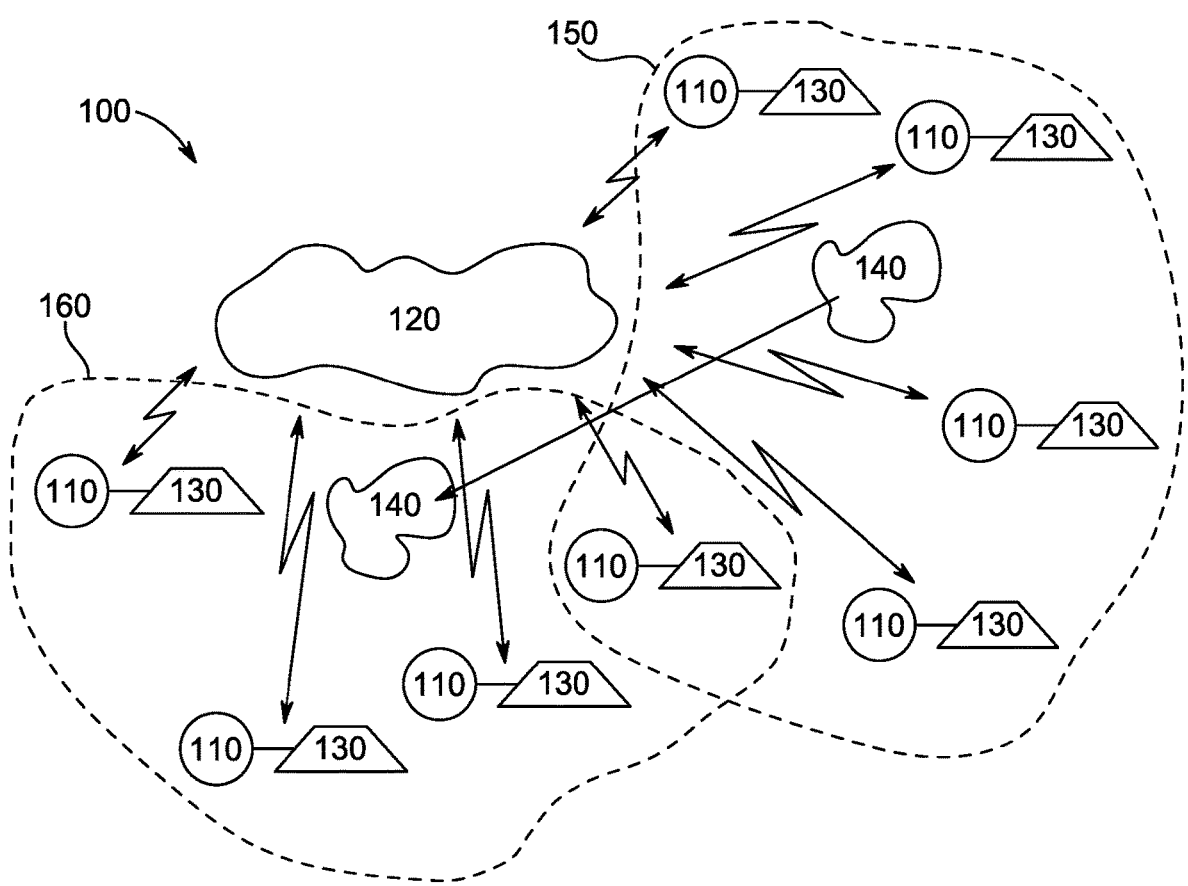
Figure 3:
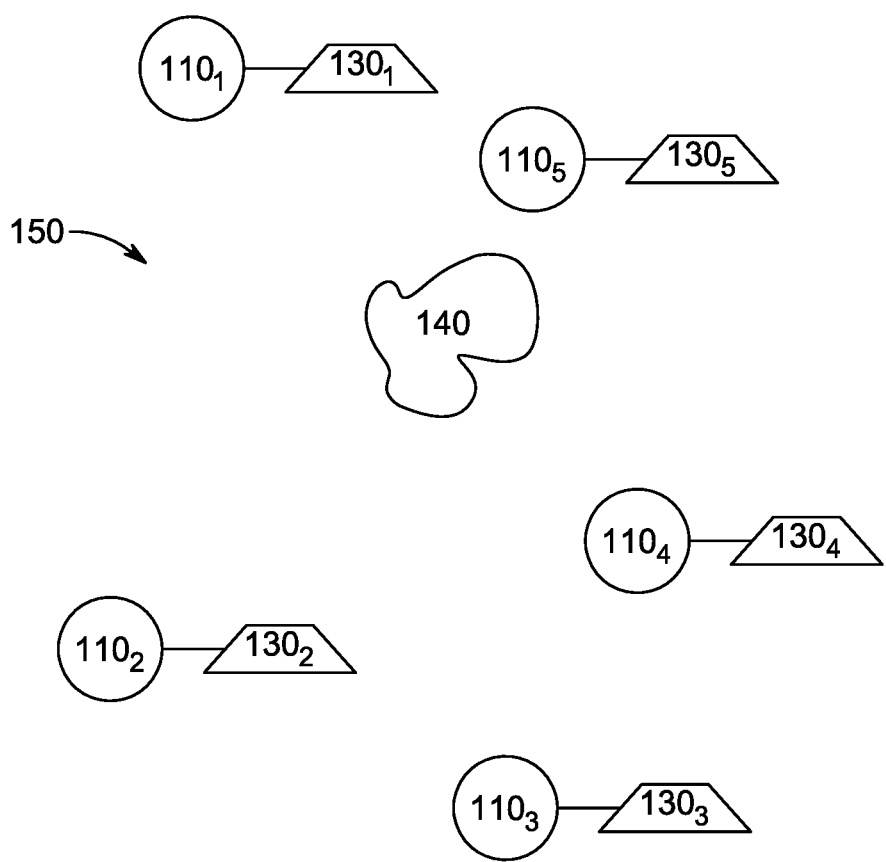
Figure 4:
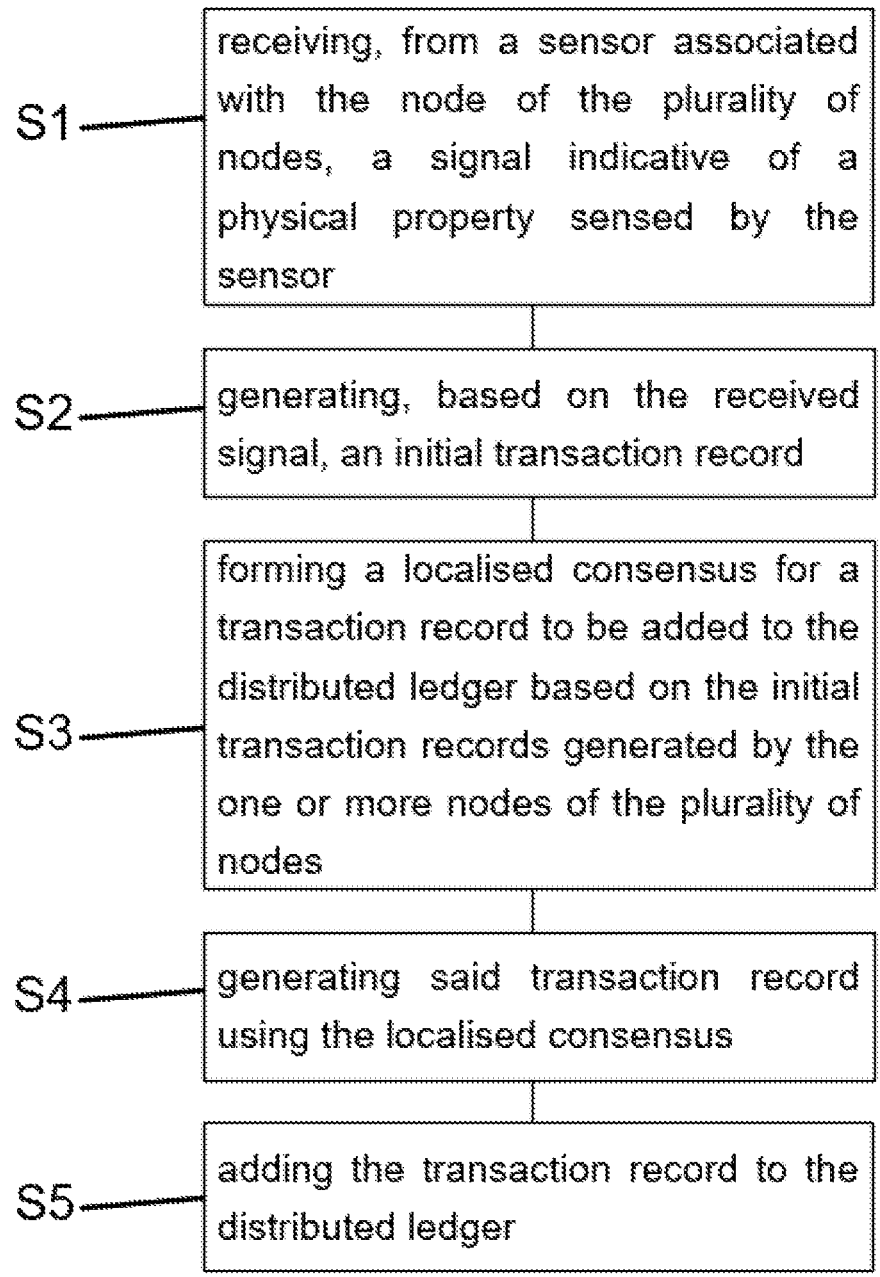
Figure 5:
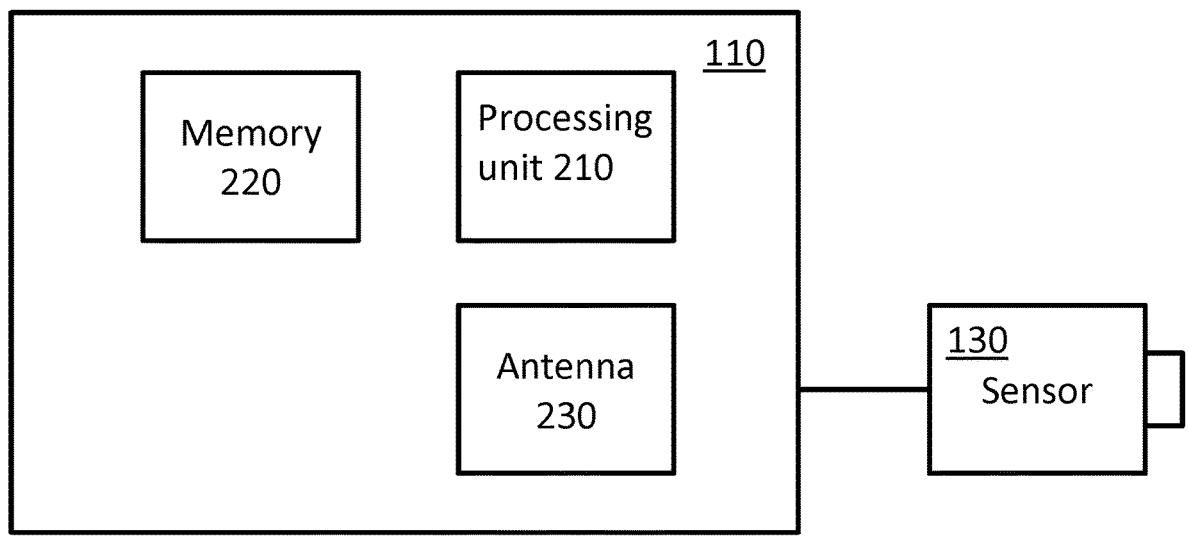

Arrangements of the embodiments will be understood and appreciated more fully from the following detailed description, made by way of example only and taken in conjunction with drawings in which:

FIG. 1 shows a known distributed ledger system;
FIG. 2 shows an embodiment of part of a distributed ledger system of an embodiment;
FIG. 3 shows a detail of the distributed ledger system of FIG. 2;
FIG. 4 illustrates a method of an embodiment;
FIG. 5 shows a node sensor combination.

DETAILED DESCRIPTION

According to an aspect there is provided a computer implemented method of providing a localised consensus mechanism for a distributed ledger comprising a plurality of nodes. The method comprises, in one or more nodes of the plurality of nodes, receiving, from a sensor associated with the node of the plurality of nodes, a signal indicative of a physical property sensed by the sensor and generating, based on the received signal, an initial transaction record. The method further comprises forming a localised consensus of a transaction record to be added to the distributed ledger based on the initial transaction records generated by the one or more nodes of the plurality of nodes, generating said transaction record using the localised consensus and adding the transaction record to the distributed ledger.

In an embodiment the initial transaction record comprises an indication of a quality of the signal provided by the sensor.

In an embodiment each initial transaction record used in forming the localised consensus comprises a same type of indication of a quality of the signal.

In an embodiment said consensus is formed by at least one of selecting a most recently created initial transaction record as the localised consensus, selecting as the localised consensus an initial transaction record that is based on a received signal with at least one of a highest indication of quality or a highest signal value or calculating a weighted average of the signals upon which the initial transaction records are based, wherein the weighted average is weighted using indications of the quality of the signals.

In an embodiment the method further comprises adding to the transaction record an indication of a method used in forming the localised consensus.

In an embodiment the formed localised consensus includes an indication of the level of trust in the localised consensus.

In an embodiment, if initial transaction records generated by different nodes of the plurality of nodes contradict each other, at least one of excluding contradicting initial transaction records from the localised consensus or excluding all initial transaction records generated within a predetermined time period that includes a time or times at which the contradicting initial transaction records were formed from the localised consensus.

In an embodiment the method further comprises incorporating an indication of initial transaction records that have been excluded from an earlier localised consensus in a subsequent transaction record.

In an embodiment, if a node of the plurality of nodes fails to add the transaction record to the distributed ledger, the node of the plurality of nodes stores a copy of the transaction record locally for later inclusion in the distributed ledger.

In an embodiment the copy of the transaction record is added as part of a subsequent transaction record to the distributed ledger.

According to another embodiment there is provided a node comprising a processor and memory. The node may be communicatively couplable to a sensor. The memory stores computer program instructions executable by the processor. The computer program instructions, when executed by the processor, cause the processor to receive, from a sensor that is communicatively coupled with the node, a signal indicative of a physical property sensed by the sensor, to generate, based on the received signal, an initial transaction record, to receive further initial transaction records from other nodes communicatively coupled to the node, to form a localised consensus of a transaction record to be added to a distributed ledger based on the initial transaction record generated by the node and the further initial transaction records received from the other nodes, to generate a transaction record using the localised consensus and to add the transaction record to a distributed ledger.

In an embodiment the initial transaction record comprises an indication of a quality of the signal received from the sensor.

In an embodiment the consensus is formed by at least one of selecting, from among the generated initial transaction record and the received further initial transaction records, a most recently created initial transaction record as the localised consensus, selecting as the localised consensus, from among the generated initial transaction record and the received further initial transaction records, an initial transaction record that is based on a received signal with at least one of a highest indication of quality or a highest signal value or calculating a weighted average of the signals upon which the respective generated initial transaction record and the further received initial transaction records are based, wherein the weighted average is weighted using indications of the quality of the signals.

In an embodiment the computer program instructions are further configured to cause the processor to add to the transaction record an indication of a method used in forming the localised consensus.

In an embodiment the formed localised consensus includes an indication of the level of trust in the localised consensus.

In an embodiment the computer program instructions are further configured to cause the processor to, if initial transaction records of the generated initial transaction record and the received further initial transaction records contradict each other, at least one of exclude, from the localised consensus, contradicting initial transaction records of the generated initial transaction record and the received further initial transaction records or exclude, from the localised consensus, all initial transaction records generated within a predetermined time period that includes a time or times at which the contradicting initial transaction records were formed.

In an embodiment the computer program instructions are further configured to cause the processor to incorporate an indication of initial transaction records that have been excluded from an earlier localised consensus in a subsequent transaction record.

According to another embodiment there is provided a non-transitory storage medium storing computer program instructions for execution by a processor in a node communicatively couplable to the node. The computer program instructions, when executed, causing the processor to receive, from a sensor that is communicatively coupled with the node, a signal indicative of a physical property sensed by the sensor, generate, based on the received signal, an initial transaction record, receive further initial transaction records from other nodes communicatively coupled to the node, form a localised consensus of a transaction record to be added to a distributed ledger based on the initial transaction record generated by the node and the further initial transaction records received from the other nodes, generate a transaction record using the localised consensus and add the transaction record to a distributed ledger.

FIG. 1 shows an example of a known distributed ledger system 100. The distributed ledger systems 100 comprise a plurality of communicatively connected nodes 110. The nodes 110 may be distributed over a large geographic area, as such as worldwide, or may form a more geographically limited network that serves a given geographic area, such as a given country. The nodes may be publicly accessible or alternatively may be accessible only to employees or contractors of or people otherwise authorised by a company. The nodes may be independently operated or may, alternatively, be operated under the auspices of a single entity, such as a single company. A number of the nodes 110 store a history of transaction data in the form of a ledger or block of chains, often referred to as a "block chain". The terms "distributed ledger", "ledger" and "blockchain" are used interchangeably herein.

All of the nodes 110 may store a copy of the ledger. As shown in FIG. 1 a ledger/blockchain comprises a sequence of blocks, illustrated as block n−2 to block n in FIG. 1, wherein each block comprises information relating to one or more transactions. The length of the sequence of blocks increases with the age of the ledger and may comprise tens, hundreds, thousands, tens of thousands or even more blocks. Each block may comprise a same number of transactions or the number of transactions stored in each block may be different. Each block further comprises information of the state of a preceding block and in particular of the immediately preceding block, i.e. the last block that has been generated prior to the generating of the block in question. This information can take many forms. In the example the information is a hash of the preceding block. In this manner the preceding block cannot be manipulated after the next subsequent block is created without any such manipulation being evident from a comparison of the information of the state of the preceding block stored in the subsequent block and information of the state of the preceding block computed at a time at which the state of the preceding block is checked. Specifically, if hash values are used to preserve a record of the state of the preceding block at the time at which the subsequent block is formed, then computing a later hash value using the same algorithms used for creating the earlier hash value should yield the same hash value. Discrepancy in the two calculated values indicates that the preceding block has been manipulated.

Whilst the arrangement of transactions in blocks and the arrangement of blocks in chains in the above-described manner prevents manipulation of earlier generated blocks it does not ensure that a newly generated block correctly reflects a particular factual scenario. To address this concern known blockchain systems make use of various mechanisms for achieving a consensus regarding the content of a next block to be added to the chain. Some consensus mechanisms are, for example, require the completion of a mathematical task, with the first node solving the mathematical problem being the node entitled to add a block to the chain. The so determined to block is then added to the chain by all of the interconnected nodes that store a copy of the blockchain.

As several or all of the nodes 110 store a copy of the ledger, detail of transactions on the ledger are easily accessible, even in situations where a particular node 110 is not presently accessible. This is useful not only for the robustness of the ledger as the failure of one or more nodes, be that due to technical problems or because the nodes were compromised by third parties, still leaves the information stored in alternative copies of the ledger available for the purpose of adding new blocks or indeed for the purpose of inspection. As such, means for inspection of the block chain, for example to identify the status of an object that has been made subject to a transaction, are also provided by the nodes 110.

Known consensus mechanisms rely on a plurality of the nodes 110 being able to work on finding consensus in similar ways. However, existing frameworks of distributed ledgers are not designed especially for traceability applications for events that occur in the physical world. Existing methods for transaction validation are designed for value transfers where a consensus mechanism decides who can create a new valid record/block (validate and record transactions) and everyone else add it into its ledger/chain of records. Generally, any member of the ledger network can be chosen to investigate the ledger and confirm that a new transaction is valid, e.g., the parties involved in the transaction are authorised and have enough balance on their record.

Ensuring trust in the data is of prime importance. In embodiments distributed ledger technology, such as the system described above with reference to FIG. 1, is used as the platform to facilitate the data exchange, considering that such systems provide the merit of tamper proof records of data and easy accessibility.

In traceability applications a transaction takes place when there is a change of physical condition of an object. It is difficult for a transaction to be validated by a node that has no direct observation of the physical change. For example, it is difficult for a node located in a retail store to validate the change of product location within a warehouse far away.

Some known consensus mechanisms are based on the use of a global resources to validate a transaction anywhere in the network of nodes. This does, however, not include any mechanism of validating if the data/record involves a description of physical events. In this sense, the trustworthiness of the data in the ledger relies mainly on the node generating the transaction record.

Disclosed herein is a new consensus mechanism is proposed including a local consensus mechanism to enhance the trustworthiness of data recording in distributed ledger technology. The proposed consensus mechanism resolves the aforementioned issues and hence are more advantageous for supply chain traceability application.

FIG. 2 illustrates part of a distributed ledger system 100 according to an embodiment. As in FIG. 1 the system 100 comprises a plurality of nodes 110 that can individually access a network 120 and can communicate with each other through the network for the purpose of updating the distributed ledger. A plurality of the nodes 110 stores a copy of the ledger and maintains this copy in an up-to-date state. As indicated in FIG. 2, the nodes may wirelessly connect to the network. The present disclosure is, however, not limited to wireless connection to the network and any way of nodes connecting to the network and exchanging data with each other through the network or directly is encompassed by the present disclosure.

Each node 110 is communicatively connected to a sensor 130. The sensor 130 is capable of measuring one or more physic-al properties of an object or product of interest and to provide a signal indicative of a measured value of the physical property to the node 110.

Each node 110 is, moreover, capable of/configured to initiate the adding of a transaction or of a block comprising the transaction to its own ledger and to cause the update of copies of the ledger stored in other nodes 110 so that the other nodes 110 also comprise the newly added transaction or block comprising the transaction. It will be appreciated that, if the node 110 causes the adding of a transaction to the distributed ledger (as opposed to the adding of a complete block) then this transaction will need to be incorporated in a block, for example alongside other transactions. Such incorporation into blocks is performed, in one embodiment, according to known mechanisms for generating consensus regarding the transactions that are to be included in a new block for the distributed ledger. The transaction recorded on the distributed ledger comprises, alongside the consensus value, also an indication of the method used for determining this consensus value. In this manner the trustworthiness of the transactions and blocks can be evaluated at a later time, for example in an attempt to identify nodes or groups of nodes that consistently or at least repeatedly contribute transaction records of low trustworthiness, be that because a sensor 130 associated with the node 110 or the node 110 is faulty or because the node 110 has been compromised.

As can be seen from FIG. 2, an object 140 may occupy an area that is covered by a plurality of nodes 110/sensor 130 combinations. The object 140 may, for example, occupy an area 150 covered by the five sensor 110/node 130 combinations indicated in FIG. 2. These node/sensors do not have to be arranged in a predefined group that is limited to the membership of these sensors, Instead the group of sensors 150 can form in an ad hoc manner. In particular the node 110/sensor 130 grouping may be formed in response to the relevant sensors 130 measuring a physical property associated with the object 140 as and when the object 140 enters into their respective sensing range.

As can also be seen from FIG. 2, as a product moves it may transition from a sensing range of some sensors 130 to lie within the sensing range of other sensors 130. Consequently, the physical properties of the object 140 may be observed by a different group 160 of node 110/sensor 130 combinations. As can be seen from FIG. 2, the two areas 150 and 160 may share nodes 110/sensors 130. This may be the case if the object moves within a given geographic location that is covered by a plurality of node 110/sensor 130 combinations, wherein the sensing range of individual sensors is smaller than the size of the physical location. This said, in another embodiment the areas 150/160 may be completely distinct and may cover different geographical locations. For example, one area 150 may cover a particular factory area, such as a production facility whilst the area 160 may cover a different factory or a sales area, such as a depot, warehouse or shop. The groups 150 and 160 may also have the same geographical location such as a factory but may be distinguished by sub-location within the factory such as a production line or a storage area of the factory.

The physical properties or conditions that can the sensed by the sensors 130 may include a temperature of the object or product or of the part of the environment currently occupied by the object or product, humidity and/or pressure and/or gas density of the part of the environment currently occupied by the object or product, the weight of the object, the location of an object or product and the sensors used for monitoring any such physical properties may include at least one of temperature sensors, gas sensors, optical sensors, such as cameras capable of detecting visible light, infrared, ultraviolet and the like and may employ charged coupled nodes or CMOS detectors, non-optical sensors, such as sensors for sensing energy in other frequency bands of the electromagnetic spectrum, such as x-rays, radio frequency and magnetic field strength sensors, weigh scales or any other type of sensor that is capable of or configured to sense a physical condition of a product. Physical conditions that may be sensed by the sensors include, in embodiments, the temperature of the object or product or of the part of the environment currently occupied by the object or product of the product, the temperature of an environment in which the product is located, a humidity and/or pressure and/or gas density of the part of the environment currently occupied by the object or product and a location of the product.

The nodes 110 receive signals from the respective associated sensors 130. The signal represent a physical property of the object 140 as sensed by the sensor associated with the node 110. Based on a signal received from the sensor each node 110 generates an initial transaction record reflective of the physical state of the object 140, as determined by the sensor associated with the node 110.

From FIG. 2 it will be appreciated that, when the object 140 is in the rightmost position, such initial transaction records are created by the nodes 110 within area 150. The nodes 110 that are not within area 150 do not generate any initial transaction records relating to the object 140 whilst the object is in the rightmost position as the sensors 130 associated with these modes 110 cannot sense the object 140 when in the rightmost position.

In one embodiment in addition to or based on the sensed signal the sensor 130 or the node 110 creates a quality indicator that provides an indication of the quality of the signal received by the sensor 130. For this purpose the signal received by the sensor 130 may be analysed by the sensor 130 or the node 110 and a quality indication may be derived from the analysed signal. This quality indication may, for example, be a signal-to-noise ratio of the signal. Alternatively or additionally the object 140 may carry an RFID tag and the system 100 may comprise means for transmitting electromagnetic energy to the tag. The tag in return emits a signal that may be detectable by the sensor 130 or by an additional RF sensor associated with the node 110 and located in close proximity to the sensor 130. An RSSI of the signal received from the RFID tag can be used to estimate the distance between the object 140 and the sensor 130 and can consequently be used as a proxy of the reliability of the signal measured by the sensor 130. Other quality indicators may be time stamps, magnetic field strength, CSI data, etc.

Time stamps allow identifying the order in which measurements were taken, even if the measurements were taken within one particular reporting period (and may, consequently, be included in the same block on the distributed ledger).

Each of the nodes 110 has a unique ID. When a node 110 receives a signal indicative of a physical property of the object 140 from an associated sensor 130 the node 110 transmits its ID, alongside the initial transaction record as well as the quality indicator/measure of trustworthiness of the data and metadata to its surroundings.

The nodes 110 are configured to consider themselves as members of a local consensus group if they receive a transmission of the above described nature within a given time window surrounding their own transmission of data of the above described nature. The local consensus group comprises all nodes 110 that have transmitted an initial transaction record since the last block has been added to the distributed ledger. The nodes 110 are moreover configured to either adjust the data they hold in relation to the physical property of the object 140 sensed by the sensor 130 in the sensing event in question or to store a separate set of consensus data relating to the sensing event. The data is adjusted or the separate consensus data is generated based on predetermined rules accessible to all stored within the nodes 110. These rules may include:

In all nodes: use of the data received from the node 110 that has provided the most recent reading;

In all nodes: use of the data received from the node 110 that has the highest quality indicator, for example RFID RSSI In all nodes: use of a weight average of all received data as described in more detail below whilst the above rules perform well in practice it will be appreciated that other rules for reaching local consensus between the nodes 110 may instead be used. In an embodiment these rules can be flexibly adjusted depending on the required sensing task. In an embodiment the nodes 110 provide an indication, preferably alongside or as part of the initial transaction record of the rules they are configured to follow, for example by indicating a version number of the rules as part of the transmission.

Once local consensus has been generated one of the nodes 110 is selected for adding the consensus data as a transaction to a block and for adding the block to the distributed ledger or, alternatively, for transmitting the transaction to the network 120 for inclusion in a block alongside other transactions. The node 110 selected for this purpose is, in one embodiment, the node 110 with the highest value data or the node 110 with the data having the highest quality indicator associated with it. The so selected node 110 proceeds to transmit the consensus data either in the form of a new block for inclusion in a distributed ledger or as a transaction that is to be included in the distributed ledger to the network 120 and, in this way to all other nodes 110. This transmission includes an indication of the manner in which consensus has been achieved, for example an indication of the rule used for creating consensus. In an embodiment an indication of the trustworthiness of the consensus is further included in this transmission. This trustworthiness indication may be a direct output of the rule used for reaching consensus or may additionally or alternatively be based on factors that have not influenced the consensus making process. For example, if only a single sensor 130 has measured a physical property of object 140 then consensus may still be reached on the basis of such a single measurement. However, such a consensus indication is less trustworthy than an indication provided by a group of sensors, given that poor sensing quality suffered by a single contributing sensor 130 cannot be compensated by higher quality measurements generated by other sensors 130. Equally, if a sole node 110 provides a measurement but the node is compromised or faulty then less weight should be attributed to the information provided by any such node. In one embodiment consensus information originating from measurements received by only a single node 110 are not added as valid transactions on the distributed ledger. The received consensus information is nevertheless added to the distributed ledger in the form of a transaction that has not been deemed trustworthy. This allows the identification of nodes 110 that, over time, have provided several consensus indications that have not been deemed trustworthy. In this manner faulty or compromised nodes may be identified.

The nodes 110 are further configured to discard entire sets of initial transaction records if two or more such initial transaction records provide data that contradict each other. In one embodiment such data are, however, only discarded if the conflicting or contradicting data have comparable quality indicators. In this situation, however, a note of receipt of such contradictory data is made and stored on the distributed ledger with an indication that the associated initial transaction records have been discarded. In one embodiment a corresponding note is submitted with the next valid consensus data that is to be added to the distributed ledger the manner already described above.

It is envisaged that, if the selected node 110 does not add the consensus transaction record to the ledger within a predetermined period of time then the remaining nodes 110 assume that the selected node 110 has developed a fault. In this case the remaining nodes 110 maintain a copy of the consensus information. This copy is attached to a next consensus information and, whilst in this manner it is not added as a valid transaction on the distributed ledger, a record of the consensus reached is nevertheless placed on the distributed ledger as a note associated with the next transaction that is validly added to the ledger.

The manner in which local consensus is generated in an embodiment is now described with reference to FIG. 3, which shows the nodes 110 and sensors 130 of group 150 shown in FIG. 2 in more detail. For ease of reference the nodes 110 have been given sub-indices $110_1$ to $110_5$ and the sensors 130 have been given sub-indices $130_1$ to $130_5$. The product 140 is located within the geographic covered by sensors $130_1$ to $130_5$, Each of the sensors $130_1$ to $130_5$ senses a physical property of product 140 and reports a corresponding signal to the associated node $110_1$ to $110_5$. In the embodiment of the product 140 also carries an RFID tag and the nodes 110 detect the RSSI of the signal received from the RFID tag. The nodes generates individual initial transaction records and transmit these to their environment in the manner discussed above. Each of the nodes $110_1$ to $110_5$ receive the transmission from the respective other nodes and determine a local measurement consensus based on the received transmissions.

In an embodiment, the local consensus is formed based on the initial transaction records and a predetermined rule applied to the localised consensus group. In an embodiment the rule defines that the valid value of the measured physical property may be the weighted average of the legitimate initial reports from the sensors and nodes and may be calculated as follows:

$$\text{Final reading} = \frac{\sum_{i=0}^{n} Q_i * Raw_i}{\sum_{i=1}^{n} Q_i}$$

where i is the node index, Q is the quality indicator/value (for example the RSSI value mentioned above) and Raw is the raw value of the data reported by the sensor to the sub-node.

Using such a weight average, a weak (and hence not very trustworthy) signal contributed by a node that is located at a large distance from the object, such as node $130_3$ in FIG. 3 makes only a small contribution to the final reading due to its associated low quality value. Data associated with node $110_5$ in contrast will be associated with a very high quality indicator and will consequently contribute more strongly to the final reading/consensus value. The impact of the data contributed by any faulty or compromised node 110 on the final reading/consensus values also mitigated given that in this embodiment an average value of all readings is calculated.

In an embodiment, once the local consensus has been formed, the node contributing most prominently to the local consensus, for example the node that has contributed the signal with the best quality indicator/value, for example the best RSSI value or the node that is deemed to have provided the most reliable reading generates a block for adding to the blockchain/distributed ledger. Optionally this block is initially considered a draft block and the node that has created the draft block communicates it to one or more or all other nodes that have contributed to the local consensus. All nodes may be configured to check that the draft block corresponds with/reflects the agreed local consensus and to transmit their agreement or disagreement with the addition of the proposed block to the node that has originally proposed the draft block. If the proposing node receives agreement that the draft block can be added to the distributed ledger from all of the other nodes that have contributed to the local consensus or, in another embodiment, from a majority of the other nodes, the node that has created the draft block proceeds to add the draft block to the distributed ledger in a known way.

The distributed ledger is configured to provide information to users via various user interface. In this manner the physical conditions an object or product has been subjected to during its manufacture and/or physical transport can be checked. It can, for example, be determined if a product has been made the subject of physical conditions outside a prescribed range of conditions. It can, for example, be checked if a frozen product has been exposed to above zero temperatures since it has first been frozen.

Based on the recording of the mechanisms used for reaching consensus and of faulty or contradictory data submissions as part of the ledger a user of the distributed ledger can also, through the interface provided by the nodes, interrogate whether or not a particular nodes have provided poor data quality and/or have consistently provided incorrect readings. In this way, compromised or faulty nodes can be identified.

Whilst in the above described embodiments initial transaction records are shared amongst the nodes 110 and the nodes then individually generate a consensus for submission to the distributed ledger by one of the nodes 110 in an alternative embodiment an access point or access node to the distributed ledger is additionally provided. In one embodiment the only function of the access point is to add the transaction record in the form of a new block or in the form of a transaction for inclusion in a new block to the distributed ledger. In another embodiment, however, the nodes 110 are configured to transmit the initial transaction record to the access node. The access node then forms the localised consensus and generate the transaction record in the manner described above before adding it to the distributed ledger.

FIG. 4 shows the steps of a localised consensus mechanism of an embodiment. In step S1 individual nodes 110 receive, from a sensor 130 associated with the node 110, a signal indicative of a physical property sensed by the sensor 130. In step S2 an initial transaction record is generated based on the received signal. In step S3 a localised consensus of a transaction record to be added to the distributed ledger is formed based on the initial transaction records generated by the one or more nodes of the plurality of nodes. In step S4 the transaction record is generated using the localised consensus and added to the distributed ledger in step S5.

FIG. 5 illustrates a sensor and node system comprising a sensor 130 communicatively connected to a node 110 for transmission of sensing data from the sensor 130 to the node 110. In one embodiment, the node comprises a processor 210, a memory 220 and an antenna 230. The memory 220 stores computer program instructions for execution by the processor 210 that, when executed by the processor causes the node 110 to perform the steps discussed above. The antenna 230 is provided for communication between nodes as discussed above.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method, comprising:
    receiving, from a first sensor associated with a first node, a first signal indicative of a physical property sensed by the first sensor;
    generating, based on the received first signal, a first initial transaction record;
    receiving, from a second sensor associated with a second node, a second signal indicative of a physical property sensed by the second sensor;
    generating, based on the received second signal, a second initial transaction record;
    forming a localised consensus of a consensus transaction record to be added to a distributed ledger including the first node and the second node based on at least one of the first initial transaction record or the second initial transaction record;
    generating the consensus transaction record using the localised consensus; and
    adding the consensus transaction record to the distributed ledger, wherein
    the first initial transaction record comprises an indication of a quality of the first signal provided by the first sensor,
    the first initial transaction record used in forming the localised consensus comprises a same type of indication of a quality of the first signal, and
    the second initial transaction record used in forming the localised consensus comprises a same type of indication of a quality of the second signal.

2. The method according to claim 1, wherein the localised consensus is formed by at least one of:
- selecting a most recently created initial transaction record as the localised consensus;
- selecting as the localised consensus an initial transaction record that is based on a received signal with at least one of a highest indication of quality or a highest signal value; or
- calculating a weighted average of signals upon which the first initial transaction record and the second initial transaction record are based, wherein the weighted average is weighted using indications of the quality of the signals.

3. The method according to claim 1, further comprising adding to the consensus transaction record an indication of a method used in forming the localised consensus.

4. The method according to claim 1, wherein the formed localised consensus includes an indication of a level of trust in the localised consensus.

5. The method of claim 1, wherein, if a node of the first node or the second node fails to add the consensus transaction record to the distributed ledger, the node of the first node or the second node stores a copy of the consensus transaction record.

6. The method of claim 5, wherein the copy of the consensus transaction record is added as part of a subsequent transaction record to the distributed ledger.

7. A method according to claim 1, wherein, A method, comprising:
- receiving, from a first sensor associated with a first node, a first signal indicative of a physical property sensed by the first sensor;
- generating, based on the received first signal, a first initial transaction record;
- receiving, from a second sensor associated with a second node, a second signal indicative of a physical property sensed by the second sensor;
- generating, based on the received second signal, a second initial transaction record;
- forming a localised consensus of a consensus transaction record to be added to a distributed ledger including the first node and the second node based on at least one of the first initial transaction record or the second initial transaction record;
- generating the consensus transaction record using the localised consensus; and
- adding the consensus transaction record to the distributed ledger, wherein
- the first initial transaction record comprises an indication of a quality of the first signal provided by the first sensor,
- the first initial transaction record used in forming the localised consensus comprises a same type of indication of a quality of the first signal,
- the second initial transaction record used in forming the localised consensus comprises a same type of indication of a quality of the second signal, and
- if the first initial transaction record and the second initial transaction record generated by the first node and the second node contradict each other, the method includes performing at least one of:
- excluding contradicting initial transaction records from the localised consensus; or
- excluding all initial transaction records generated within a predetermined time period that includes a time or times at which the contradicting initial transaction records were formed from the localised consensus.

8. The method according to claim 7, further comprising: incorporating an indication of initial transaction records that have been excluded from an earlier localised consensus in a subsequent transaction record.

9. A node, comprising:
a receiver configured to:
- receive, from a sensor that is communicatively coupled with a first node, the first node indicating the node, a first signal indicative of a physical property sensed by the sensor, and
- receive a second initial transaction record from a second node that is communicatively coupled with the first node; and a processor configured to:
- generate, based on the received first signal, a first initial transaction record;
- form a localised consensus of a consensus transaction record to be added to a distributed ledger including the first node and the second node based on at least one of the first initial transaction record or the second initial transaction record,
- generate the consensus transaction record using the localised consensus, and
- add the consensus transaction record to the distributed ledger, wherein
the first initial transaction record comprises an indication of a quality of the signal received from the sensor, and
the first initial transaction record used in forming the localised consensus comprises a same type of indication of a quality of the signal.

10. The node according to claim 9, wherein the processor is configured to form the localized consensus by at least one of:
- selecting, from among the first initial transaction record and the second initial transaction record, a most recently created initial transaction record as the localised consensus;
- selecting as the localised consensus, from among the first initial transaction record and the second initial transaction record, an initial transaction record that is based on a received signal with at least one of a highest indication of quality or a highest signal value; or
- calculating a weighted average of signals upon which the first initial transaction record and the second initial transaction record are based, wherein the weighted average is weighted using indications of the quality of the signals.

11. The node according to claim 9, wherein the processor is configured to add to the consensus transaction record an indication of a method used in forming the localised consensus.

12. The node according to claim 9, wherein the processor is configured to form the localised consensus including an indication of a level of trust in the localised consensus.

13. The node according to claim 9, wherein the processor is configured to, if the first initial transaction record and the second initial transaction record contradict each other, at least one of:
- exclude, from the localised consensus, contradicting initial transaction records of the first transaction record and the second initial transaction record; or
- exclude, from the localised consensus, all initial transaction records generated within a predetermined time period that includes a time or times at which the contradicting initial transaction records were formed.

14. The node according to claim 13, wherein the processor is configured to incorporate an indication of initial transaction records that have been excluded from an earlier localised consensus in a subsequent transaction record.

15. A non-transitory storage medium storing computer program instructions for execution by a processor, the computer program instructions, when executed, causing the processor to:
- receive, from a sensor that is communicatively coupled with a first node, a signal indicative of a physical property sensed by the sensor;
- generate, based on the received signal, a first initial transaction record;
- receive a second initial transaction record from a second node communicatively coupled to the first node;
- form a localised consensus of a consensus transaction record to be added to a distributed ledger including the first node and the second node based on the at least one of the first initial transaction record or the second initial transaction record;
- generate the consensus transaction record using the localised consensus; and
- add the consensus transaction record to the distributed ledger, wherein
- the first initial transaction record comprises an indication of a quality of the signal received from the sensor, and
- the first initial transaction record used in forming the localised consensus comprises a same type of indication of a quality of the signal.

* * * * *